US007251270B2

(12) United States Patent
Betts (10) Patent No.: US 7,251,270 B2
(45) Date of Patent: Jul. 31, 2007

(54) SYSTEMS AND METHODS FOR FRACTIONAL BIT RATE ENCODING IN A COMMUNICATION SYSTEM

(75) Inventor: William L. Betts, St. Petersburg, FL (US)

(73) Assignee: Paradyne Corporation, Largo, FL (US)

(*) Notice: Subject to any disclaimer, the term of this patent is extended or adjusted under 35 U.S.C. 154(b) by 667 days.

(21) Appl. No.: 09/785,366

(22) Filed: Feb. 16, 2001

(65) Prior Publication Data

US 2003/0206578 A1 Nov. 6, 2003

Related U.S. Application Data

(60) Provisional application No. 60/212,849, filed on Jun. 20, 2000.

(51) Int. Cl.
*H04B 1/38* (2006.01)

(52) U.S. Cl. .................................................. 375/219

(58) Field of Classification Search ................ 375/219, 375/220, 223, 225, 259, 261, 265, 285, 298, 375/316, 340–341; 714/752, 759, 774, 810
See application file for complete search history.

(56) References Cited

U.S. PATENT DOCUMENTS

| 4,805,167 | A | | 2/1989 | Leslie et al. ................ 370/84 |
|---|---|---|---|---|
| 4,882,726 | A | | 11/1989 | Lang et al. ................. 370/24 |
| 5,008,902 | A | | 4/1991 | Key et al. ................... 375/10 |
| 5,103,227 | A | | 4/1992 | Betts ......................... 341/61 |
| 5,214,672 | A | * | 5/1993 | Eyuboglu et al. ........... 375/254 |
| 5,216,694 | A | * | 6/1993 | Wei ........................... 375/286 |
| 5,230,010 | A | | 7/1993 | Betts et al. ................. 375/39 |
| 5,251,236 | A | | 10/1993 | Brehmer et al. ............. 375/59 |
| 5,301,209 | A | * | 4/1994 | Wei ........................... 375/265 |
| 5,493,586 | A | * | 2/1996 | Brownlie et al. ........... 375/265 |
| 5,559,561 | A | * | 9/1996 | Wei ........................... 348/470 |
| 5,559,835 | A | | 9/1996 | Betts ......................... 375/265 |
| 5,684,834 | A | | 11/1997 | Betts et al. ................. 375/298 |
| 5,844,944 | A | | 12/1998 | Betts et al. ................. 375/298 |
| 5,859,877 | A | | 1/1999 | Betts et al. ................. 375/298 |
| 5,995,548 | A | * | 11/1999 | Williams et al. ............ 375/242 |
| 6,081,555 | A | * | 6/2000 | Olafsson .................... 375/242 |
| 6,157,678 | A | * | 12/2000 | Wei ........................... 375/243 |
| 6,259,742 | B1 | * | 7/2001 | Olafsson et al. ............ 375/242 |
| 6,553,063 | B1 | * | 4/2003 | Lin et al. ................... 375/223 |

OTHER PUBLICATIONS

ITU—Telecommunication Standardization Sector—Temporary Document F1-U15R2, Study Group 15, Fiji Island, Jan. 31-Feb. 4, 2000, Question: 4/15-Abstract-Q4/15 Rapporteur's Group (12 pps.).

(Continued)

*Primary Examiner*—Khanh Tran
(74) *Attorney, Agent, or Firm*—Thomas, Kayden, Horstemeyer & Risley LLP (57) ABSTRACT

Systems and methods for encoding fractional bit rates in a communication system, such as a pulse amplitude modulation (PAM) communication system, are provided. The systems and methods enable a first transceiver to specify to a second transceiver a desired fractional bit rate for transmitting data to the first transceiver. In this manner, the systems and methods of the present invention for the first time enable a single standardized specification of a generalized transmitter that may be used to implement any type of fractional encoding or mapping.

92 Claims, 6 Drawing Sheets

OTHER PUBLICATIONS

ITU—Telecommunication Standardization Sector—Temporary Document NT-071, Study Group 15, Nashville, Tennessee, Nov. 1-5, 1999; Question: 4/15-Abstract—PAM mapping. (2 pps.).

International Telecommunication Union (ITU-T) Telecommunication Standardization Sector of ITU, V.90 (Sep. 1998); Series V: Data Communication Over the Telephone Network, Simultaneous transmission of data and other signals—Recommendation (50 pps.).

ITU—Telecommunication Standardization Sector—Temporary Document, Study Group 15, Fiji Island, Jan. 31-Feb. 4, 2000, Question: 4/15-Abstract-Draft Recommendation (149 pps.).

* cited by examiner

SYSTEMS AND METHODS FOR FRACTIONAL BIT RATE ENCODING IN A COMMUNICATION SYSTEM

CROSS-REFERENCE TO RELATED APPLICATION

This application claims priority to copending U.S. provisional application entitled, "Generalized Fractional PAM Mapper," having Ser. No. 60/212,849, filed Jun. 20, 2000, which is entirely incorporated herein by reference.

TECHNICAL FIELD

The present invention is generally related to data communication systems and methods, and more particularly, is related to systems and methods for fractional bit rate encoding.

BACKGROUND OF THE INVENTION

Data communication typically occurs as the transfer of information from one communication device to another. This is typically accomplished by the use of a modem located at each communication endpoint. In the past, the term "modem" denoted a piece of communication apparatus that performed a modulation and demodulation function, hence the term "modem." Today, the term modem is typically used to denote any piece of communication apparatus that enables the transfer of data and/or voice information from one location to another. For example, modem communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. DSL devices can be referred to as modems, or, more accurately, transceivers, which connect the telephone company central office to the user, or remote location, typically referred to as the customer premises (CP). Various DSL communication devices use different formats and different types of modulation schemes and achieve widely varying communication rates. However, even the slowest DSL communications devices achieve data rates far in excess of conventional point-to-point modems.

In pulse amplitude modulation (PAM) communication systems, information in the form of an n-bit word is encoded to a number of voltage levels (PAM levels). The voltage levels are selected so that the encoded bits can be decoded at a receiving device. This process is sometimes referred to as "mapping." The PAM voltage levels correspond to the bits of information to be transmitted and the bits are encoded into a signal constellation. The transmit signal is transmitted to a receiving device. The receiving device analyzes the received waveform and attempts to decode the waveform to recover the encoded bits.

In a conventional PAM transmitter, as defined in the ITU-T draft recommendation G.991.2 (G.shdsl), incorporated herein by reference, a PAM system having 16 levels is defined. Alternatively, $2^K$ levels, in which K represents the number of encoded bits and is an integer, are possible. Changing the number of encoded bits (K) results in undesirably large (on the order of 6 dB) performance degradation. Such a large performance degradation indicates that the PAM transmitter may be operating up to 6 dB below channel capacity.

Thus, it would be desirable to have a communication system, such as a PAM communication system, capable of using most or all of the available channel capacity.

SUMMARY OF THE INVENTION

The present invention provides systems and methods for encoding fractional bit rates in a communication system, for example, a PAM communication system. The systems and methods enable a first transceiver to specify to a second transceiver a desired fractional bit rate for transmitting data to the first transceiver. Thus, the systems and methods of the present invention for the first time enable a single standardized specification of a generalized transmitter that may be used to implement any type of fractional encoding or mapping.

Briefly described, in architecture, one of many possible implementations of a transceiver according to the present invention comprises a means for receiving information associated with a destination transceiver, the information relating to a plurality of signal space constellation points supported by the destination transceiver and a means for encoding, based on the information associated with the destination transceiver, an integer number of bits into a plurality of symbols such that the ratio of the integer number of bits and the plurality of symbols is a non-integer. The transceiver may further comprise a means for encoding, based on the information associated with the destination transceiver, each of the plurality of symbols into one of a plurality of analog symbols corresponding to the signal space constellation points. The system may also comprise a means for providing the plurality of analog symbols to the destination transceiver.

Briefly, another possible implementation of a transceiver according to the present invention comprises a means for providing information to a source transceiver, the information capable of being used to determine a fractional bit rate, a means for receiving a plurality of analog symbols from the source transceiver, each of the plurality of analog symbols corresponding to a signal space constellation, and a means for decoding the plurality of analog symbols into an integer number of bits comprising a plurality of symbols such that the ratio of the integer number of bits and the plurality of symbols is a non-integer corresponding to the fractional bit rate.

The present invention can also be viewed as providing one or more methods for encoding fractional bit rates in a communication system. Briefly, one such method involves the steps of: receiving information associated with a destination transceiver, the information relating to a plurality of signal space constellation points supported by the destination transceiver and, based on the information associated with the destination transceiver, encoding an integer number of bits into a plurality of symbols such that the ratio of the integer number of bits and the plurality of symbols is a non-integer. The method may further involve encoding each of the plurality of symbols into one of a plurality of analog symbols corresponding to the signal space constellation points and providing the plurality of analog symbols to the destination transceiver.

The present invention may also be viewed as providing one or more methods for controlling the symbol transmission rate in a communication system. Briefly, one such method involves the following steps: (1) providing information to a source transceiver, the information capable of being used to determine a fractional bit rate, (2) receiving a plurality of analog symbols from the source transceiver, each of the plurality of analog symbols corresponding to a signal space constellation, and (3) decoding the plurality of analog symbols into an integer number of bits comprising a plurality of symbols such that the ratio of the integer number of bits and the plurality of symbols is a non-integer corresponding to the fractional bit rate.

Briefly, another such method for controlling the symbol rate supplied to a destination transceiver over a communication channel in a communication system involves the following steps: (1) determining a maximum number of signal space constellation points capable of being supported by the destination transceiver and the communication channel, (2) providing information associated with the maximum number of signal space constellation points to a source transceiver, (3) receiving a plurality of analog symbols on the communication channel, each of the plurality of analog symbols corresponding to the plurality of signal space constellation points and one of the maximum number of, signal space constellation points and (4) decoding the plurality of analog symbols into an integer number of bits comprising a plurality of symbols such that the ratio of the integer number of bits and the plurality of symbols is a non-integer corresponding to a fractional bit rate associated with the maximum number of signal space constellation points.

DETAILED DESCRIPTION OF THE INVENTION

Having summarized the invention above, the invention will now be described in detail with reference to the drawings. While the invention will be described in connection with these drawings, there is no intent to limit it to the embodiment or embodiments disclosed. On the contrary, the intent is to cover all alternatives, modifications and equivalents included within the spirit and scope of the invention as defined by the appended claims.

I. System Overview

Figure 1:
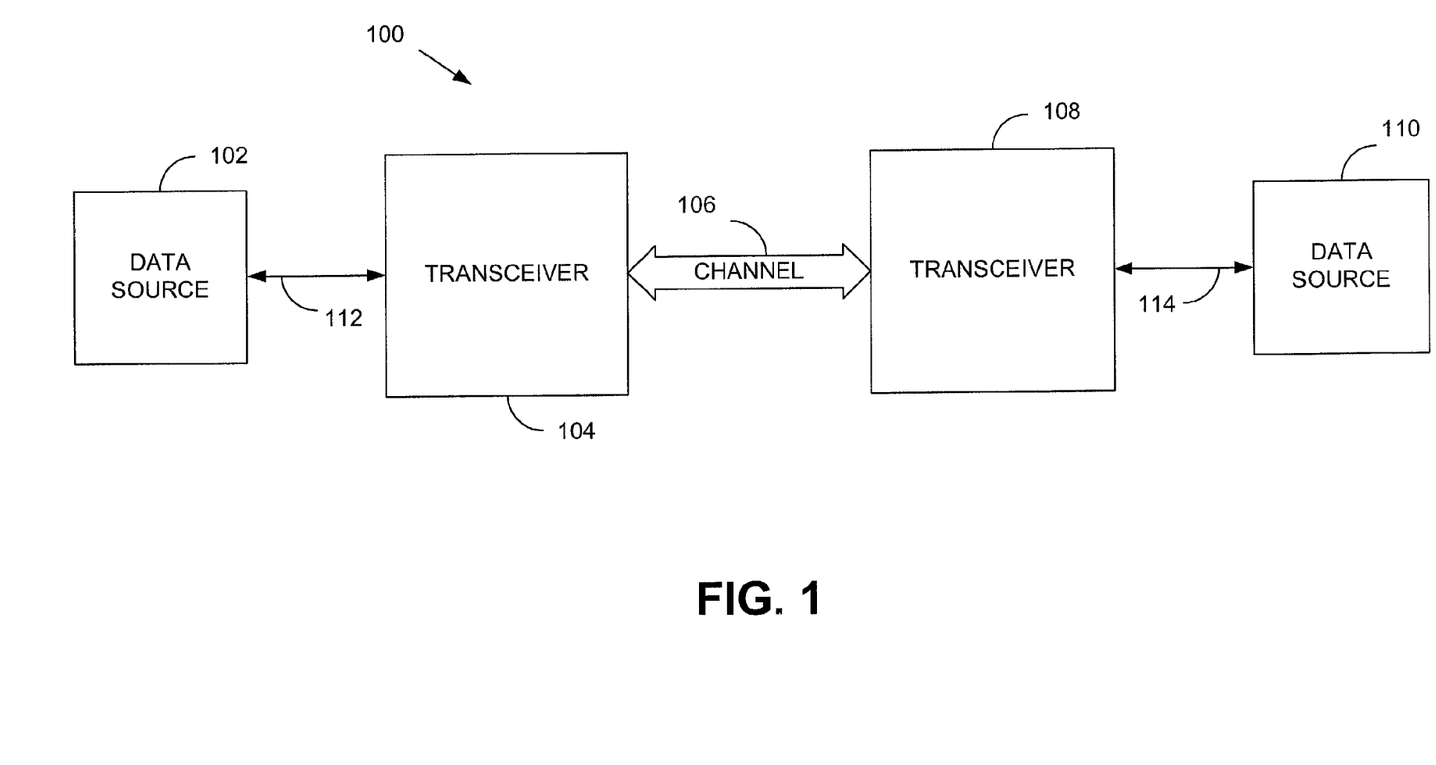
FIG. 1 is a block diagram illustrating one of a number of potential embodiments of a communication system in which the systems and methods of the present invention may be employed.

FIG. 1 is a block diagram illustrating one of a number of potential embodiments of a communication system 100 in which the systems and methods of the present invention may be employed. Communication system 100 comprises data source 102, transceiver 104, communication channel 106, transceiver 108, and data source 110. Data source 102 communicates with transceiver 104 via connection 112. Data source 110 communicates with transceiver 108 via connection 114. Transceivers 104 and 108 communicate via channel 106, which may be a wired connection or a wireless connection.

Communication system 100 is bi-directional in that data may be transmitted in a downstream direction from data source 102 to data source 110 or in the upstream direction from data source 110 to data source 102. For example, in the downstream direction, data source 102 provides a message signal to transceiver 104 via connection 112. As described in detail below, transceiver 104 transforms the message signal into a form compatible with communication system 100 and suitable for transmission over channel 106. The transmitted signal is received by transceiver 108. Transceiver 108 reconstructs the original message signal from the received signal and provides it to data source 110 via connection 114. Communication system 100 operates in a similar fashion in the upstream direction.

Figure 2:
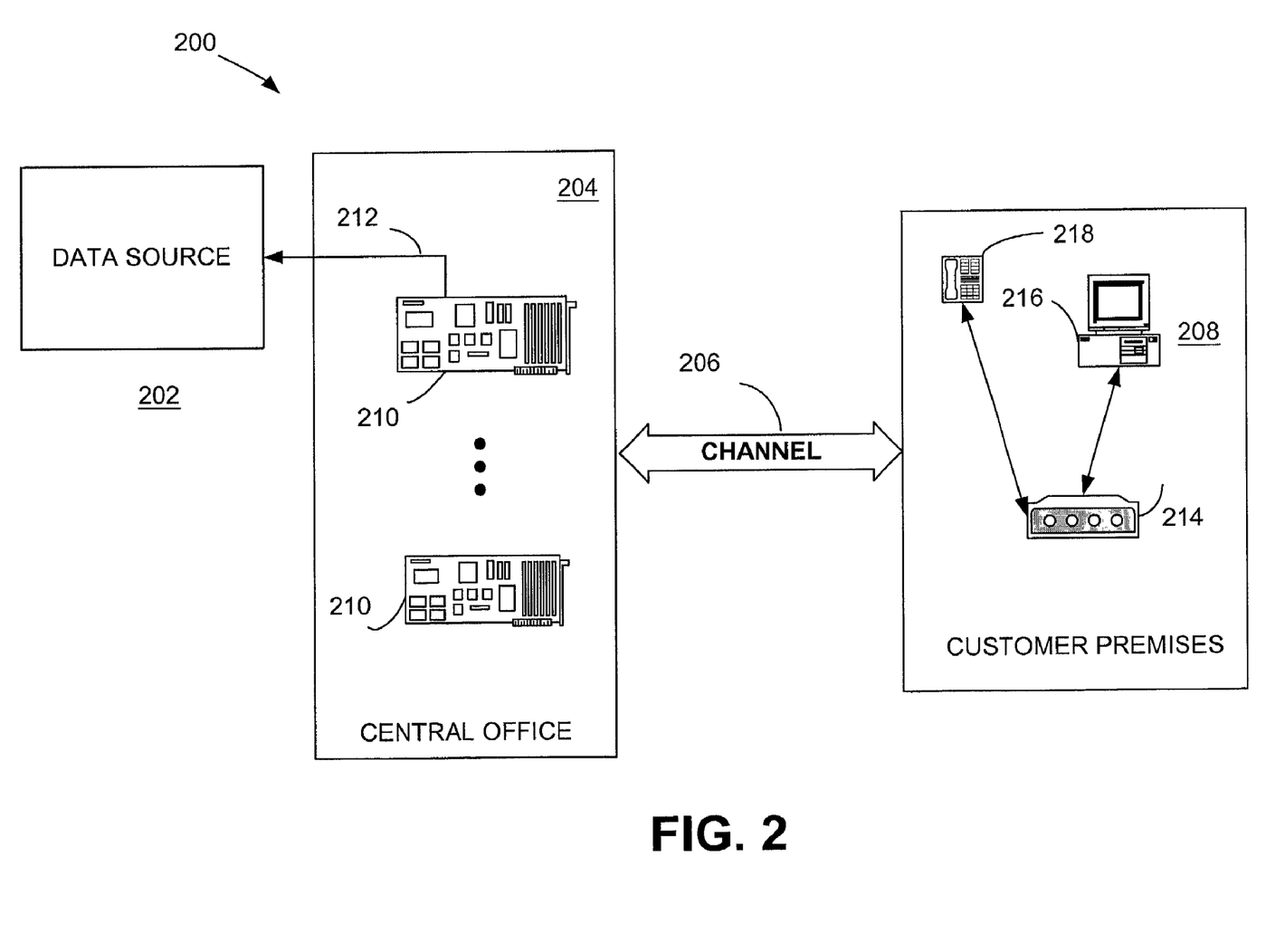
FIG. 2 is a block diagram illustrating another embodiment of a communication system in which the systems and methods of the present invention may be employed.

Communication system 100 may be any pulse amplitude modulation (PAM) communication system. For example, FIG. 2 illustrates a block diagram of another of the potential embodiments of a communication system 200 in which the systems and methods of the present invention may be implemented. Communication system 200 is in a digital subscriber line (DSL) communication environment. Communication system 200 may be a single-pair high speed digital subscriber line (SHDSL) communication system. However, as known by those of ordinary skill in the art, the systems and methods of the present invention may be employed in other PAM communication systems, including other DSL communication environments. For example, the systems and methods of the present invention may be implemented in a communication system based on symmetric DSL technologies such as high bit rate DSL (HDSL), symmetric DSL (SDSL), multi-rate SDSL (MSDSL), rate adaptive DSL (RADSL), and any other known or future DSL technology.

Communication system 200 comprises data source 202, central office 204, communication channel 206, and customer premises 208. Central office 204 communicates with customer premises 208 via communication channel 206. Communication channel 206 may be a copper wire pair for delivering DSL services that typically extends between a central office and a remote customer location, and is commonly referred to as the "local loop," or "subscriber loop." In one embodiment, the transmission scheme between central office 204 and customer premises 208 is point-to-point full duplex SHDSL, using pulse amplitude modulation (PAM) line coding. As is known by those of ordinary skill in the art, other communication schemes are possible between central office 204 and customer premises 208, such as, for example, variations of multi-point and half duplex.

Central office 204 includes a number of DSL transceivers 210. DSL transceiver 210 exchanges information with data source 202 via connection 212 and interfaces with communication channel 206 in order to communicate with a DSL transceiver 214 located at customer premises 208. Data source 202 may be, for example, a computer to which a data source 216 in customer premises 208 is communicating. In alternative embodiments, data source 202 may also represent access to an external communication network, such as for example, the Internet or any other data network, via an Internet Service Provider (ISP) or any other data access provider.

DSL transceiver 214 located at customer premises 208 communicates with data source 216 and a plain old telephone service (POTS) device 218. DSL transceiver 214 also interfaces with communication channel 206. Although omitted for clarity, a POTS splitter is typically installed between communication channel 206 and POTS device 218 to prevent POTS device 218 from interfering with the DSL communication and to prevent DSL signals from degrading POTS performance. Data source 216 may be a personal computer (PC) or any other similar processing-based system and POTS device 218 may be a typical telephone. Alternatively, data source 216 and POTS device 218 are combined in one physical device. In a preferred embodiment, DSL transceiver 214 may be located in a home or office, and is used to allow simultaneous data communication and voice communication using data source 216 and POTS device 218, respectively. In the example that follows, the PAM signal spectrum may overlap the POTS signal spectrum, in which case simultaneous POTS operation with POTS device 218 is not allowed.

As described above with respect to communication system 100, DSL transceiver 214 communicates over communication channel 206 with DSL transceiver 210 in order to exchange data information. Data and/or voice information are transmitted over communication channel 206 and separated by DSL transceiver 210 via connection 220 and sent to typical telephone company POTS switching equipment (not shown). Data is exchanged between customer premises 208 and central office 204 in order to allow data source 216 to access data source 202.

Although illustrated using a single customer premises 208 connected to central office 204, a number of customer premises locations may be connected to one central office 204 using a plurality of communication channels. Furthermore, it is also possible for a number of customer premises locations to be connected to one DSL transceiver located at a central office. However, for purposes of explanation, the invention will be described with reference to a single customer premises 208 communicating with a single DSL transceiver 210 located at central office 204. Furthermore, the invention described hereafter is embodied in both DSL transceiver 210 located at central office 204 and in DSL transceiver 214 located at customer premises 208.

II. System Operation and Functionality

Figure 3:
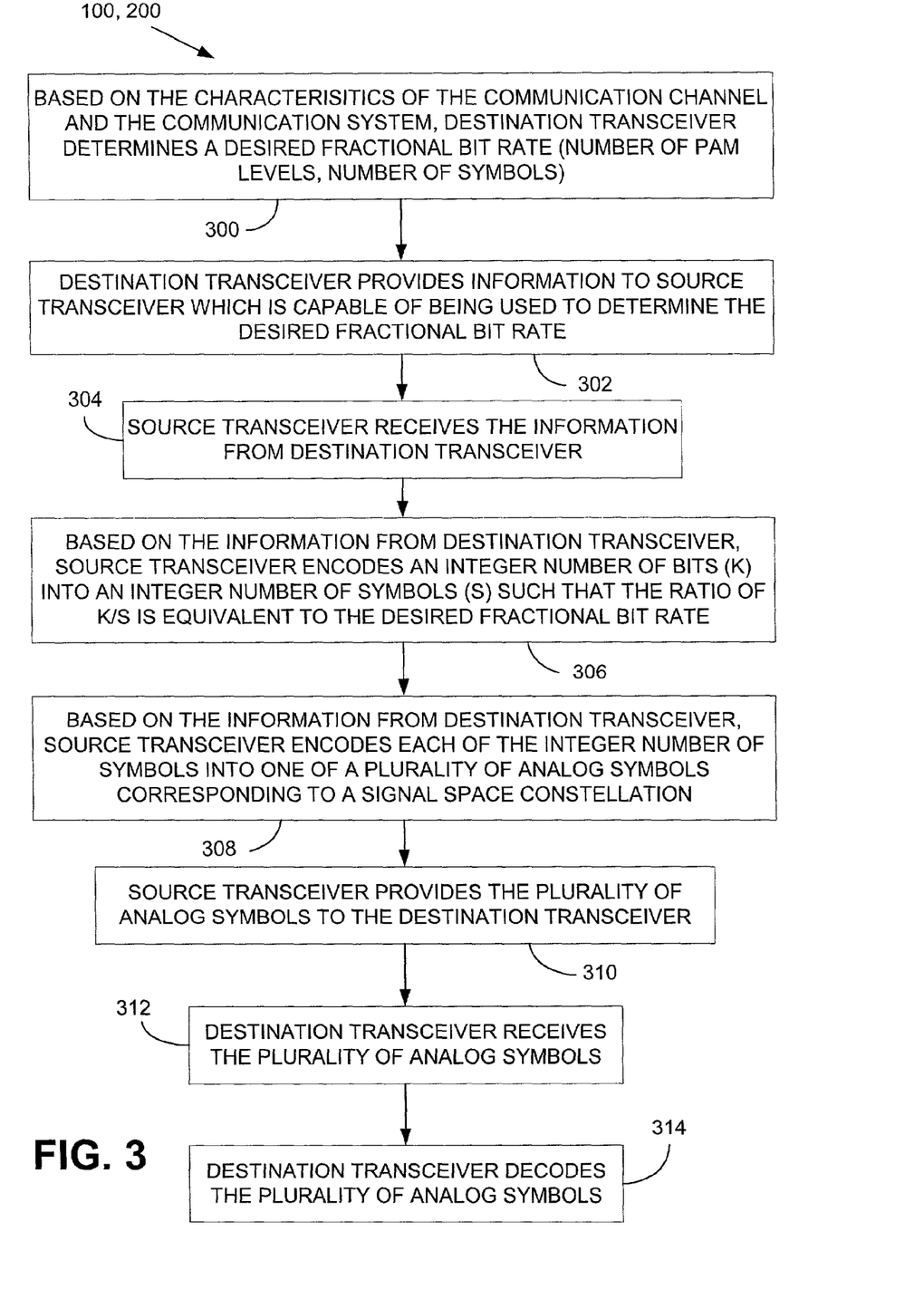
FIG. 3 is a flow chart illustrating the operation of the communication systems in FIGS. 1 and 2 and the functionality, operation, and architecture of the transceivers in FIGS. 1 and 2.

FIG. 3 is a flow chart illustrating the interaction between two transceivers in a communication system in which the systems and methods of the present invention may be implemented. For clarity, FIG. 3 is described with reference to communication system 100 of FIG. 1. However, the operation and functionality described are equally applicable to communication system 200 of FIG. 2.

Each block in FIG. 3 represents a module, segment, or portion of code embodied within a transceiver, which comprises one or more executable instructions for implementing the specified logical function(s). It should be noted that in some alternative implementations, the functions noted in the blocks may occur out of the order noted in FIG. 3. For example, two blocks shown in succession in FIG. 3 may in fact be executed substantially concurrently or the blocks may sometimes be executed in the reverse order, depending upon the functionality involved.

The functionality in each block of FIG. 3 can be implemented in hardware, software, firmware, or a combination thereof. In the preferred embodiment(s), the functionality is implemented in software or firmware that is stored in a memory and that is executed by a suitable instruction execution system. If implemented in hardware, as in an alternative embodiment, the functionality can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The functionality described in each block of FIG. 3 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Referring to FIG. 3, at block 300, transceiver 108 determines a desired fractional bit rate to be supplied by transceiver 104. The desired fractional bit rate is determined based on a variety of factors, including, for example, the characteristics of communication system 100, the characteristics of communication channel 106, the characteristics of transceiver 108 or transceiver 104, or any other desirable factor related to any of communication system 100, communication channel 106, transceiver 108, or transceiver 104.

At block 302, transceiver 108 provides information related to the desired fractional bit rate to transceiver 104. Transceiver 108 may provide any information which is capable of being used by transceiver 104 to determine the desired fractional bit rate associated with transceiver 108. For example, transceiver 108 may provide a desired number of PAM levels, a desired number of symbols, or any similar information which transceiver 104 may use to encode the desired fractional bit rate. In one of many potential embodiments, it may be sufficient to identify the symbol transmission rate, the number of bits in a frame, B, and the number of symbols in a frame, S. The number of bits and symbols are both integers. Alternatively, a single fractional value and the precision of the fraction may be provided. As a precursor, during what is known as a handshake initialization, both transceivers identify the maximum values permissible. Then in block 300, transceiver 108 may constrain the parameters to satisfy the requirements of transceiver 104.

In another possible embodiment, transceiver 108 may provide two different look-up tables, which are described in more detail below. The first look-up table may contain information configured in such a way as to enable transceiver 104 to encode an integer number of bits into a plurality of symbols such that the ratio of the integer number of bits and the plurality of symbols is a non-integer value which corresponds to the desired fractional bit rate. The second look-up table may contain information configured to enable transceiver 104 to encode each of the plurality of symbols into one of a plurality of analog symbols corresponding to a PAM signal space constellation and the desired fractional bit rate. Clearly, the information contained in the look-up tables may be provided as one table or a collection of tables. The important aspect is that the tables contain a conversion from B input bits to S integers and the PAM pulse levels corresponding to the S integers. One example is described below with reference to Tables 1 and 2. Where the information provided by transceiver 108 comprises these look-up tables, transceiver 104 may be configured to apply the information contained in the look-up tables to any of a number of fractional encoding techniques. For example, transceiver 104 may employ modulus conversion, shell mapping, or constellation switching, which are described in more detail below.

In another of the possible embodiments of the present invention, transceiver 108 does not provide look-up tables. Instead, transceiver 108 merely provides the minimal amount of information necessary for transceiver 104 to perform the encoding functions described above. Although this embodiment reduces the amount of information which transceiver 108 is required to provide to transceiver 104, it increases the complexity of the configuration of transceiver 104. For instance, transceiver 104 would be configured with at least a portion of the logic embodied in the look-up tables described above.

In another embodiment, in addition to providing information which is capable of being used by transceiver 104 to determine the desired fractional bit rate associated with transceiver 108, transceiver 108 provides an encoding algorithm. The encoding algorithm may be configured in such a way as to enable transceiver 104 to execute instructions for encoding at the desired fractional bit rate using a specified encoding technique, such as for example, modulus conversion, shell mapping, constellation switching, or any other known or future fractional encoding technique. In this embodiment, much of the encoding functionality is removed from transceiver 104 and instead provided by transceiver 108 within the encoding algorithm. For example, in one of several possible implementations of this embodiment, the encoding algorithm may be provided as a JAVA script or C-language program, in which case transceiver 104 simply executes the JAVA or C instructions.

Although many different embodiments have been described to illustrate the kinds of information provided by transceiver 108 to transceiver 104, it should be understood by one of ordinary skill in the art that various other embodiments exist which are contemplated by the systems and methods of the present invention. The purpose of illustrating these examples is to demonstrate a tradeoff which exists. For instance, on the one hand, transceiver 108 may be configured to provide more and more complicated and detailed information to transceiver 104, thereby increasing the flexibility afforded transceiver 108 with respect to fractional bit rates and reducing the complexity of the configuration of transceiver 104. However, on the other hand, this increases the amount of information, and consequently the amount of time, required to initialize communication between transceivers 104 and 108. Therefore, it should be understood that the important aspect is that transceiver 108 is able to specify a desired fractional bit rate. In this way, the systems and methods of the present invention for the first time enable a single standardized specification of a generalized transmitter that may be used to implement any encoding or mapping technique.

At block 304, transceiver 104 receives the information provided by transceiver 108. At block 306, transceiver 104 encodes, based on the information provided by transceiver 108, an integer number of bits (K) into an integer number of symbols (S) such that the ratio of K/S is equivalent to the desired fractional bit rate associated with transceiver 108. At block 308, transceiver 104 also encodes each of the integer number of symbols into one of a plurality of analog symbols corresponding to a signal space constellation. As described above, there are various embodiments in which transceiver 108 provides different types of information to transceiver 104. It should be understood that the operation of transceiver 104 may differ according to the information provided by transceiver 108. However, the important aspect is that transceiver 108 is able to specify a desired fractional bit rate which transceiver 104 provides to transceiver 108.

At block 310, transceiver 104 provides the plurality of analog symbols to transceiver 108. The plurality of analog symbols may be provided to transceiver 108 as PAM pulses or on a carrier wave. At block 312, transceiver 108 receives the plurality of analog symbols. At block 314, transceiver 108 decodes the plurality of analog symbols. Blocks 306 through 314 may repeat indefinitely while data is being communicated.

III. Components of System

As stated above, the systems and methods of the present invention may be embodied in both transceiver 104 and transceiver 108 in communication system 100 (FIG. 1) and DSL transceiver 210 and DSL transceiver 214 in communication system 200 (FIG. 2). For ease of illustration, a single DSL transceiver 210 will be described below. However, the following description is equally applicable to transceiver 104, transceiver 108, and transceiver 214.

Figure 4:
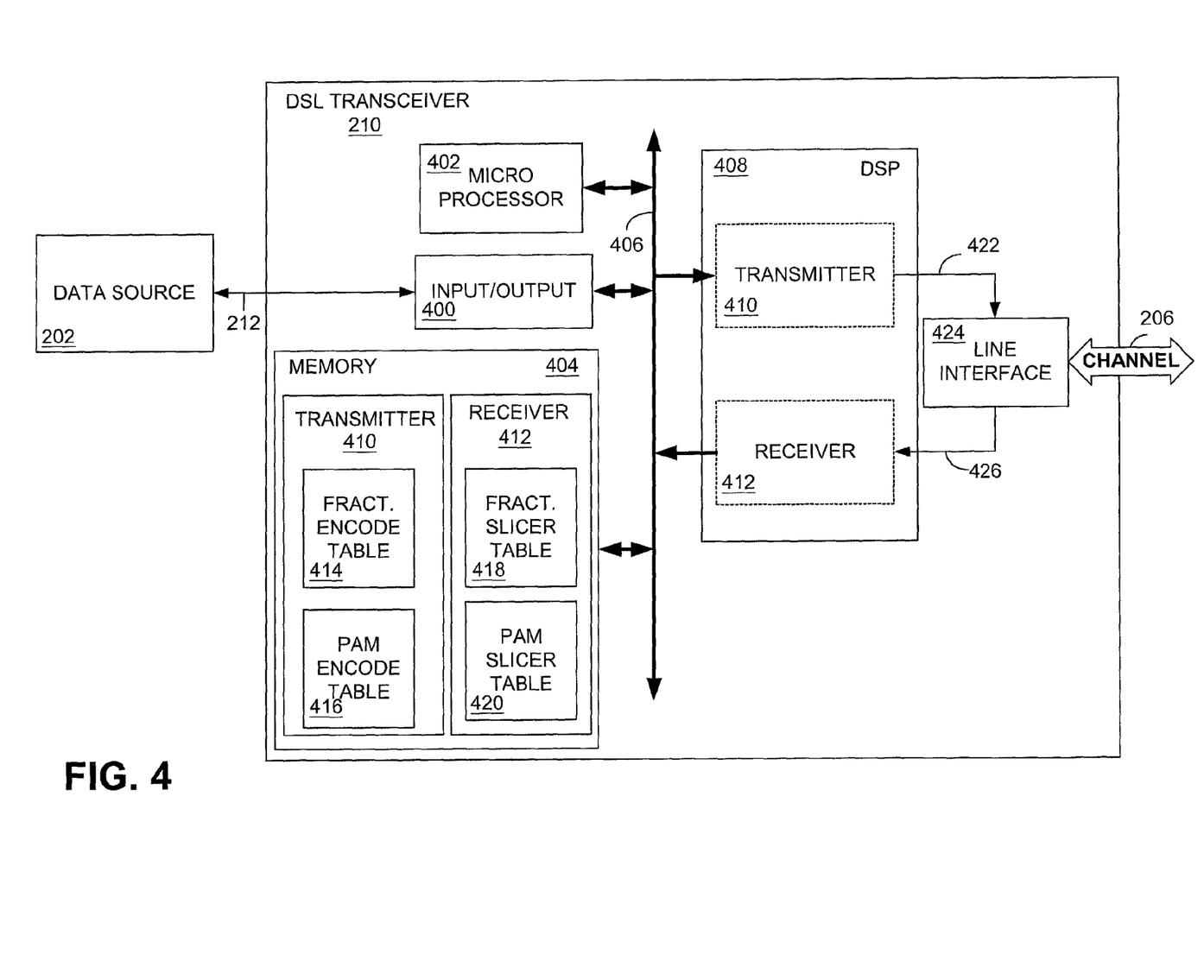
FIG. 4 is a block diagram illustrating one of a number of potential embodiments of the transceivers of FIGS. 1 and 2.

FIG. 4 is a block diagram illustrating DSL transceiver 210 of FIG. 2. DSL transceiver 210 communicates with data source 202 via connection 212 where data supplied to and received from data source 202 is exchanged via input/output element 400 within DSL transceiver 210. DSL transceiver 210 also includes microprocessor 402 and memory 404 in communication via bus 406 with digital signal processor (DSP) 408. Memory 404 and microprocessor 402 work in cooperation to store and execute the logic of the present invention. Although DSP 408 as illustrated includes transmitter 410 and receiver 412, transmitter 410 and receiver 412 may be implemented separately. Furthermore, transmitter 410 and receiver 412 are shown as residing in memory 404 so that the functionality of transmitter 410 and the functionality of receiver 412 may be stored as program code in memory 404 and executed by microprocessor 402 or DSP 408.

Memory 404 includes fractional encoder table 414 and PAM encoder table 416 (within transmitter 410) and includes fractional decoder (slicer) table 418 and PAM decoder (slicer) table 420. Tables 414, 416, 418, and 420 illustrate one possible manner of implementing the fractional bit rate encoding to be described below. As described above, various other implementations are contemplated by the present invention.

Transmitter 410 communicates via connection 422 with line interface 424 to gain access to communication channel 206. Similarly, receiver 412 receives signals from line interface 424 via connection 426. As described below, transmitter 410 and receiver 412 each include the logic to enable DSL transceiver 210 to communicate using fractional bit rates.

Figure 5:
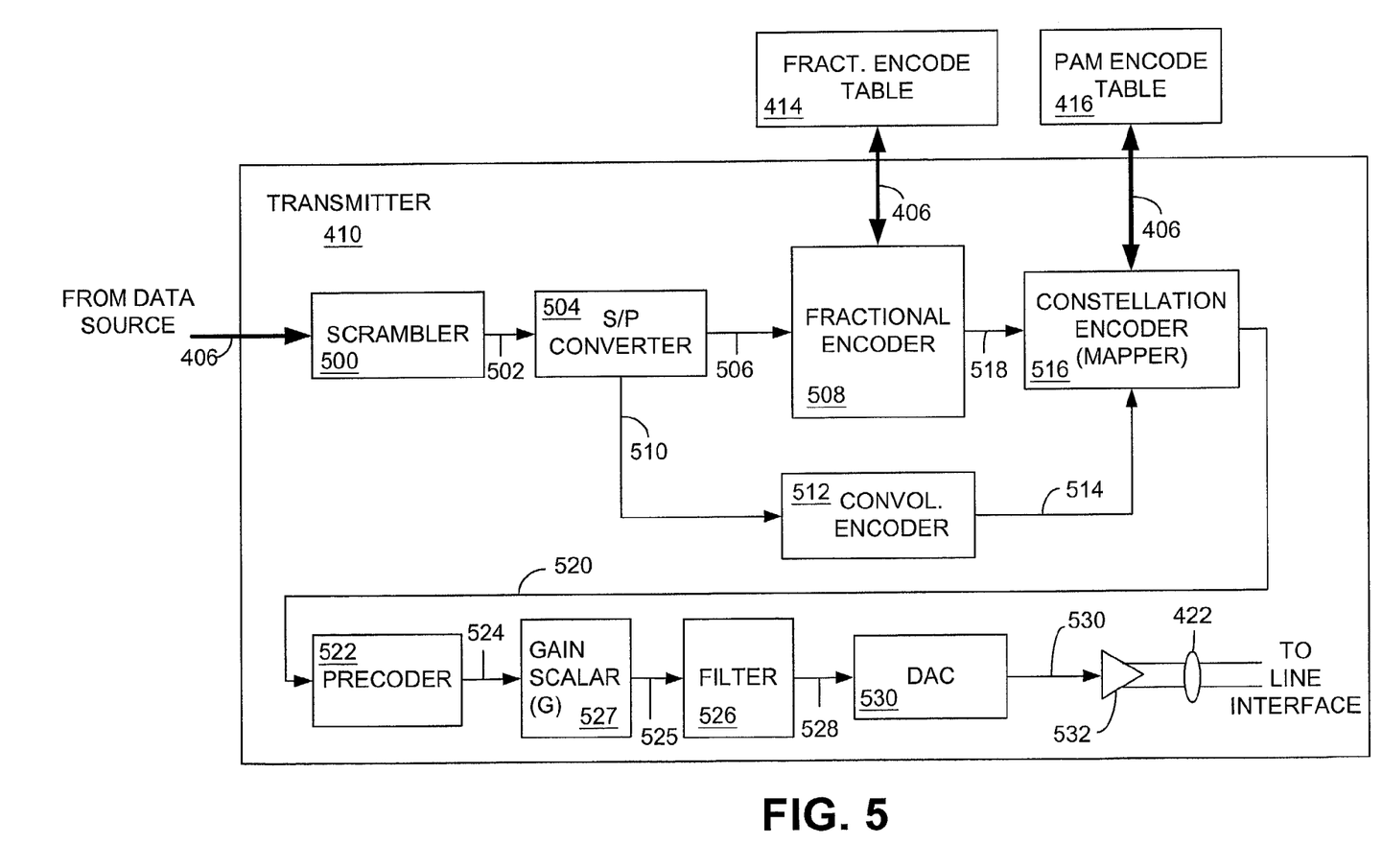
FIG. 5 is a block diagram illustrating one of a number of potential embodiments of the transmitter of FIG. 4.

FIG. 5 is a block diagram illustrating one of many possible implementations of transmitter 410 of FIG. 4. A data signal originating in data source 202 is communicated via bus 406 to scrambler 500. The signal on connection 406 is in the form of a serial bit stream and scrambler 500 provides a scrambled serial bit stream on connection 502. Scrambler 500 may be a self-synchronized scrambler or a preset free running scrambler as is known in the art. Depending upon the application, the preset scrambler may have some advantages, as in the case where Reed-Solomon coding is used. Reed-Solomon coding and interleaving is a known in the art forward error correction methodology and can optionally be implemented in transmitter 410.

Scrambler 500 provides a scrambled K bit word on connection 502 to a serial-to-parallel converter 504. Serial-to-parallel converter 504 converts the serial bit stream on connection 502 to a K-bit parallel word having the form $\{X_1(m)=s(mK+0), X_2(m)=s(mK+1), \ldots, X_k(m)=s(mK+K-1)\}$ at the $m^{th}$ symbol time, where $X_1(m)$ is the first in time. Serial-to-parallel converter 504 supplies the higher order bits on a connection 506 to a fractional encoder 508. Serial-to-parallel converter 504 supplies the least significant bit (LSB) on a connection 510 to a convolutional encoder 512. Convolutional encoder 512 may be a trellis encoder or any other known encoder for providing forward error correction coding. The least significant bit on connection 510 represents one bit for convolutional encoding. Convolutional encoder 512 performs convolutional encoding on the LSB on connection 510 and supplies two bits $Y_0(m)$ and $Y_1(m)$ on a connection 514 to a constellation encoder, sometimes referred to as a "mapper," 516. Bits $Y_0(m)$ and $Y_1(m)$ on connection 514 bypass fractional encoder 508. In the general case convolutional encoder 512 may encode more than one input bit into more than two encoded bits. Also, for fractional rate codes convolutional encoder 512 may encode only one bit on periodic symbols. If one bit is encoded per n symbols, then convolutional encoder 512 is said to be an n-dimension encoder and encodes $1/n^{th}$ bit. It is not necessary to exchange this n parameter between modems in systems such as G.991.2, where the convolutional encoder always uses n=1 to minimize latency or data transmission throughput delay.

The (K−1)-parallel bits output from serial-to-parallel converter 504 on connection 506 are supplied to fractional encoder 508. Fractional encoder 508 includes the logic for fractionally encoding the (K−1)-bit parallel words on connection 506 as described above. As stated above, there are several possible ways to implement fractional encoder 508 to encode fractional bit rates. One manner is shell mapping. Shell mapping increases peak power to achieve shaping gain. While shell mapping increases peak power, the higher level signal points occur less frequently when shaping gain is employed because the transmit energy is typically concentrated in the central points of the signal space constellation. Another manner for encoding fractional bit rates is constellation switching, which alternates between constellations of (K−1) or K bits to achieve the fractional bit encoding. Unfortunately, constellation switching also increases the peak power due to the occasional transmission of the larger K bit constellation.

Preferably, modulus conversion, as described in commonly owned U.S. Pat. No. 5,103,227, incorporated into this document by reference, is used in fractional encoder 508. Modulus conversion achieves fractional bit rates by converting the incoming bit stream on connection 506 to symbols having an arithmetic base or modulus equal to the size of the constellation. Fractional bits are transmitted when the number of points in the constellation is not a power of 2. The modulus or constellation size is computed by $M_i=2^x$ and $x=(SNR_i-Q)/6$, where $M_i$ is the modulus, x is the number of bits transmitted, $SNR_i$ is the signal-to-noise ratio of the channel and Q is the margin required for the decoder in the receiver. In accordance with an aspect of the invention, x may be a fractional value. By allowing a non-integer number of bits x to be transmitted on each PAM symbol (equivalent to one PAM pulse), a non power-of-two number of PAM levels can be encoded.

In conventional PAM, x is always an integer. The modulus converter operates by collecting an integer number of bits B, over a frame comprising several symbol periods S. The frame of B bits is then encoded for transmission at a fractional bit rate of B/S bits per symbol. For PAM the minimum number of levels is $2^{B/S}$.

Fractional encoder 508 may convert a frame of B bits into S symbols of M levels each. Convolutional encoder 512 doubles the number of levels to 2M. The modulus M is the smallest integer such that $M>=2^{B/S}$. This assures that the information capacity of the modulated symbols is sufficient, $M^S>=2^B$. The modulus conversion is an arithmetic base conversion. The B bits of the frame in binary are converted to S integers, each of arithmetic base M. The conversion process is division by the modulus. The remainders in each division step are the modulus-converted integers that will be transmitted. The remainders have integer values between 0 and M−1, and are encoded as one of M levels. The M levels are normalized to ±1/M exactly as is done for 16-PAM normalization of ±1/16.

Fractional encoder 508 performs the fractional bit rate encoding by communicating via connection 406 with memory 404 (FIG. 4), which contains the fractional encoder table 414 (shown below in Table 1).

In accordance with an aspect of the invention, two constellations may be added to the generalized mapping shown in the G.991.2 recommendation mentioned above. Constellation sizes of 12 and 24 levels can be used to map fractional bit rates of 3.5 or 4.5 bits per symbol corresponding to 2.5 or 3.5 user data bits per symbol. Convolutional encoder 512 encodes one of the data bits each symbol period, $X_1(m)$ and $X_1(m+1)$. 1.5 or 2.5 bits per symbol are modulus converted in fractional encoder 508 in accordance with fractional encoder table 414 (FIG. 4) shown in Table 1.

TABLE 1

| | Bits per Symbol = | | | | | |
|---|---|---|---|---|---|---|
| | 1.5 | | | 2.5 | | |
| | | | Modulus = | | | |
| Input | 3 | C(m) | C(m + 1) | 6 | C(m) | C(m + 1) |
| 0 | 0 | 0 | 0 | 0 | 0 | 0 |
| 1 | 1 | 0 | 1 | 1 | 0 | 1 |
| 2 | 2 | 0 | 2 | 2 | 0 | 2 |
| 3 | 10 | 1 | 0 | 3 | 0 | 3 |
| 4 | 11 | 1 | 1 | 4 | 0 | 4 |
| 5 | 12 | 1 | 2 | 5 | 0 | 5 |
| 6 | 20 | 2 | 0 | 10 | 1 | 0 |
| 7 | 21 | 2 | 1 | 11 | 1 | 1 |
| 8 | | | | 12 | 1 | 2 |
| 9 | | | | 13 | 1 | 3 |
| 10 | | | | 14 | 1 | 4 |
| 11 | | | | 15 | 1 | 5 |
| 12 | | | | 20 | 2 | 0 |

TABLE 1-continued

| | Bits per Symbol = | | | | |
|---|---|---|---|---|---|
| | 1.5 | | | 2.5 | |
| | Modulus = | | | | |
| Input | 3 | C(m) | C(m + 1) | 6 | C(m) | C(m + 1) |
| 13 | | | | 21 | 2 | 1 |
| 14 | | | | 22 | 2 | 2 |
| 15 | | | | 23 | 2 | 3 |
| 16 | | | | 24 | 2 | 4 |
| 17 | | | | 25 | 2 | 5 |
| 18 | | | | 30 | 3 | 0 |
| 19 | | | | 31 | 3 | 1 |
| 20 | | | | 32 | 3 | 2 |
| 21 | | | | 33 | 3 | 3 |
| 22 | | | | 34 | 3 | 4 |
| 23 | | | | 35 | 3 | 5 |
| 24 | | | | 40 | 4 | 0 |
| 25 | | | | 41 | 4 | 1 |
| 26 | | | | 42 | 4 | 2 |
| 27 | | | | 43 | 4 | 3 |
| 28 | | | | 44 | 4 | 4 |
| 29 | | | | 45 | 4 | 5 |
| 30 | | | | 50 | 5 | 0 |
| 31 | | | | 51 | 5 | 1 |

The most significant 3 or 5 Bits of X(m) and X(m+1) are retained over a 2 symbol period in serial-to-parallel converter 504 for input to fractional encoder 508. Fractional encoder 508 generates two output symbols C(m) and C(m+1) on connection 518 for mapping to PAM levels in constellation encoder (mapper) 516. The conversion table for C(m) and C(m+1) is stored in memory 404 (FIG. 4) as fractional encoder table 414 and is shown in Table 1. The combinations C(m)=C(m+1)=2 for 12-PAM and C(m)=C(m+1)=5 for 24-PAM are reserved to identify symbol alignment at the decoder.

The input index to the table is:

Input=$X_3(m+1)2^2+X_2(m+1)2^1+X_2(m)$ for 12-PAM or

Input=$X_4(m+1)2^4+X_3(m+1)2^3+X_2(m+1)2^2+X_3(m)2^1+X_2(m)$ for 24-PAM.

Optional 12-PAM and 24-PAM mappings encode fractional bits by encoding K−1 bits on even frames (m) and K bits on odd frames (m+1).

The two output symbols C(m) and C(m+1) on connection 518 may be supplied to constellation encoder 516. Constellation encoder 516 communicates over connection 406 with PAM encoder table 416 (FIG. 4) and shown below in Table 2. PAM encoder table 416 contains the PAM level mappings applied to the modulus converted symbols on connection 518 and bits $Y_0(m)$ and $Y_1(m)$ on connection 514. The index into PAM encoder table 416 for the first symbol period uses modulus converted symbol C(m) along with bits $Y_0(m)$ and $Y_1(m)$. The index into PAM encoder table 416 for the second symbol period uses modulus converted symbol C(m+1) along with bits $Y_0(m+1)$ and $Y_1(m+1)$.

TABLE 2

| $Y_4$ | $Y_3$ | $Y_2$ | $Y_1$ | $Y_0$ | C(m) | Z(m) | 32-PAM (5 Bits) | 24-PAM (4.5 Bits) | 16-PAM (4 Bits) | 12-PAM (3.5 Bits) | 8-PAM (3 Bits) | 4-PAM (2 Bit) |
|---|---|---|---|---|---|---|---|---|---|---|---|---|
| 0 | 0 | 0 | 0 | 0 | 0 | 0 | −31/32 | 1/24 | −15/16 | −3/12 | −7/8 | −3/4 |
| 0 | 0 | 0 | 0 | 1 | 0 | 1 | −29/32 | 3/24 | −13/16 | −1/12 | −5/8 | −1/4 |
| 0 | 0 | 0 | 1 | 0 | 0 | 2 | −27/32 | −3/24 | −11/16 | 1/12 | −3/8 | 1/4 |
| 0 | 0 | 0 | 1 | 1 | 0 | 3 | −25/32 | −1/24 | −9/16 | 3/12 | −1/8 | 3/4 |
| 0 | 0 | 1 | 0 | 0 | 1 | 4 | −23/32 | −7/24 | −7/16 | 5/12 | 1/8 | — |
| 0 | 0 | 1 | 0 | 1 | 1 | 5 | −21/32 | −5/24 | −5/16 | 7/12 | 3/8 | — |
| 0 | 0 | 1 | 1 | 0 | 1 | 6 | −19/32 | 5/24 | −3/16 | −7/12 | 5/8 | — |
| 0 | 0 | 1 | 1 | 1 | 1 | 7 | −17/32 | 7/24 | −1/16 | −5/12 | 7/8 | — |
| 0 | 1 | 1 | 0 | 0 | 2 | 8 | −15/32 | 9/24 | 1/16 | −11/12 | — | — |
| 0 | 1 | 1 | 0 | 1 | 2 | 9 | −13/32 | 11/24 | 3/16 | −9/12 | — | — |
| 0 | 1 | 1 | 1 | 0 | 2 | 10 | −11/32 | −11/24 | 5/16 | 9/12 | — | — |
| 0 | 1 | 1 | 1 | 1 | 2 | 11 | −9/32 | −9/24 | 7/16 | 11/12 | — | — |
| 0 | 1 | 0 | 0 | 0 | 3 | 12 | −7/32 | −15/24 | 9/16 | | — | — |
| 0 | 1 | 0 | 0 | 1 | 3 | 13 | −5/32 | −13/24 | 11/16 | | — | — |
| 0 | 1 | 0 | 1 | 0 | 3 | 14 | −3/32 | 13/24 | 13/16 | | — | — |
| 0 | 1 | 0 | 1 | 1 | 3 | 15 | −1/32 | 15/24 | 15/16 | | — | — |
| 1 | 1 | 0 | 0 | 0 | 4 | 16 | 1/32 | 17/24 | — | | — | — |
| 1 | 1 | 0 | 0 | 1 | 4 | 17 | 3/32 | 19/24 | — | | — | — |
| 1 | 1 | 0 | 1 | 0 | 4 | 18 | 5/32 | −19/24 | — | | — | — |
| 1 | 1 | 0 | 1 | 1 | 4 | 19 | 7/32 | −17/24 | — | | — | — |
| 1 | 1 | 1 | 0 | 0 | 5 | 20 | 9/32 | −23/24 | — | | — | — |
| 1 | 1 | 1 | 0 | 1 | 5 | 21 | 11/32 | −21/24 | — | | — | — |
| 1 | 1 | 1 | 1 | 0 | 5 | 22 | 13/32 | 21/24 | — | | — | — |
| 1 | 1 | 1 | 1 | 1 | 5 | 23 | 15/32 | 23/24 | — | | — | — |
| 1 | 0 | 1 | 0 | 0 | | | 24 | 17/32 | | | — | — |
| 1 | 0 | 1 | 0 | 1 | | | 25 | 19/32 | | | — | — |
| 1 | 0 | 1 | 1 | 0 | | | 26 | 21/32 | | | — | — |
| 1 | 0 | 1 | 1 | 1 | | | 27 | 23/32 | | | — | — |
| 1 | 0 | 0 | 0 | 0 | | | 28 | 25/32 | | | — | — |
| 1 | 0 | 0 | 0 | 1 | | | 29 | 27/32 | | | — | — |
| 1 | 0 | 0 | 1 | 0 | | | 30 | 29/32 | | | — | — |
| 1 | 0 | 0 | 1 | 1 | | | 31 | 31/32 | | | — | — |

The modulus converted symbol C(m) along with convolutional encoded bits $Y_1(m)$, and $Y_0(m)$ are mapped to a level x(m) as shown in Table 2.

Fractional encoding enables a flexible communication system that can operate at any data transmission rate. The constellation density, or number of PAM levels, can be adjusted to match the signal to noise ratio, SNR, of any channel. During start-up, the receiver measures the channel to determine the SNR. The receiver then computes the largest constellation consistent with the desired bit error rate at the measured SNR. At the end of initialization, the receiver signals the transmitter and identifies the constellation size that the transmitter should use. An activation frame is sent identifying the constellation size, or PAM level mapping, and other parameters such as the convolutional encoder coefficients and precoder coefficients and the information contained in Tables 1 and 2. To better define Tables 1 and 2, the number of bits per frame B, the number of symbols per frame S, the constellation size M and a gain scale factor G are provided. Those skilled in the art will recognize that the size of Table 1 is $2^{B-C*S}$ entries with S variables corresponding to each entry. C=1 is the number of bits processed by the convolutional encoder per symbol or C*S bits per frame. The precision or number of bits used to specify each entry is $\log_2(M)-C-1$, where C+1 bits are generated by the convolutional encoder. The size of Table 2 is M entries with the precision $\log_2(M)+1$. One skilled in the art will recognize that only the numerator of the fractional values of Table 2 are sent with the understanding they will be normalized to 1/M. Alternatively, real integer values of higher precision, for example 16-bits, could be communicated but this may unnecessarily increase the table size.

The activation frame format is modified from that shown in ITU-T draft recommendation G.991.2 (G.shdsl) and is shown in Table 3. The activation frame is sent at the symbol rate used for data transmission, which was identified earlier during initialization or start-up handshake. The activation frame format identifies the PAM level mapping to be used.

TABLE 3

| Activation Frame Bit LSB:MSB | Definition |
|---|---|
| 1:14 | Frame Sync for $T_c$ and $T_r$: $11111001101011_2$, where the left-most bit is sent first in time<br>Frame Sync for $F_c$: $11010110011111_2$, where the left-most bit is sent first in time |
| 15:36 | Precoder Coefficient 1: 22 bit signed two's complement format with 17 bits after the binary point, where the LSB is sent first in time |
| 37:58 | Precoder Coefficient 2 |
| 59:3952 | Precoder Coefficients 3–179 |
| 3953:3974 | Precoder Coefficient 180 |
| 3975:3995 | Encoder Coefficient A: 21 bits where the LSB is sent first in time |
| 3996:4016 | Encoder Coefficient B: 21 bits where the LSB is sent first in time |
| 4017:4024 | PAM level mapping, M: 8-bits<br>Number of Bits per Frame B<br>Number of Symbols per Frame S<br>Gain scalar G<br>C0(m)<br>C0(m+1)<br>. . .<br>C0(m+S−1)<br>C1(m+1)<br>. . .<br>C1(m+S−1) |

TABLE 3-continued

| Activation Frame Bit LSB:MSB | Definition |
|---|---|
| | All C(m), C(m+1), . . ., C(m + S − 1) values<br>PAM 0<br>PAM 1 |
| . . . .:4025+Z | All M PAM levels |
| Z+4026:4153 | Vendor Data: 128 bits of proprietary information |
| Z+4154:4215 | Reserved: 62 bits set to logical zeros |
| Z+4216:4231 | CRC: $c_1$ sent first in time, $c_{15}$ sent last in time |

As described above, a fixed algorithm can actually calculate the values of Table 2. However, for generality Table 2 is best sent in the activation frame. Additional dimensions can be used. For example, more than one bit per symbol may be processed into more than 2 bits by the convolutional encoder. Or for multidimensional codes, less than S bits may be processed by the convolutional encoder per frame. For C coded bits per symbol then in general, B−C*S bits are fractionally encoded by Table 1. Furthermore, some number of bits U per symbol may not be processed by Table 1 or the convolutional encoder. This technique is known in the art as shaping by rings, where groups of bits are directly encoded. This simplifies the complexity and size of Table 1. The number of bits processed by Table 1 is then B−C*S−U*S. As described previously for 24-PAM, the address for extracting data from Table 1 is:

$$X_4(m+1)2^4+X_3(m+1)2^3+X_2(m+1)2^2+ X_3(m)2^1+\ldots+X_2(m)$$

The address for extracting data from Table 2 is:

$$C(m)*2^{(C+U+1)}+u(m)*2^{(C+1)}+Y_C*2^{(C)}+\ldots+Y_1(m)*2+Y_0(m),$$

where C(m) is the integer value extracted from Table 1 and u(m) is the integer value of the U bits that are neither fractionally encoded nor convolutional encoded. $Y_C(m)$, . . . $Y_1(m)$ and $Y_0(m)$ are the bits from the convolutional encoder, which generates one more bit than the C bits input to it.

Note that negotiation parameters must be exchanged in pre-activation or handshake to indicate maximum and minimum values of the parameters B, S, M, C and U that are permitted in each modem. Thus, the receiver will not construct a table too large for the remote transmitter. Furthermore, it may be desirable to exchange several sets of tables as shown in Tables 1 and 2. Then after the activation phase the data transmission rate or other parameters may be modified during operation by simply identifying which set of tables to use.

For the example of 12-PAM M=12, B=5, S=2, C=1 and G=+0.5 dB for ½ dB of shaping gain. Table 1 contains the $2^{5-2}$=8 pairs of values: 0,0,0,1,0,2,1,0,1,1,1,2,2,0,2,1. Table 2 contains the M=12 values: −3,−1,1,3,5,7,−7,−5,−11,−9,9,11.

Referring again to FIG. 5, the signal containing the encoded transmit symbol is supplied on a connection 520 to a precoder 522. Precoder 522 may comprise a filter (not shown) and a modulo operator (not shown). Precoder 522 maintains the average power of the signal on connection 520 so that the signal power remains within a predefined envelope.

The precoded signal on connection 524 is then gain scaled by a scalar G 527 and supplied to filter 526 on connection 525. Sophisticated receivers may construct Table 1 to yield shaping gain, which may require complex calculations in the transmitter to determine G. In a preferred embodiment, the receiver calculates G and notifies the remote transmitter of this value. G is unity, or 0 dB, during pre-activation and takes on the specified value when entering data mode. This is at the same time the precoder and convolutional encoder are activated.

Filter 526 may be configured to exhibit different characteristics depending on the type of modulation being used. For example, when PAM is employed, filter 526 may not be required or may be a low pass filter that filters the passband of the signal.

The signal on connection 528 may be supplied to a digital-to-analog converter (DAC) 530. DAC 530 converts the digital domain signals on connection 528 to the analog domain on connection 530. The analog signal on connection 530 is amplified by a differential transmit amplifier 532, which is the line driver for transmitter 410, for transmission via connection 422 to line interface 424 of FIG. 4 and for transmission via communication channel 206. DAC 530 may include a filter (not shown) to help control the power spectrum density (PSD) for spectrum management.

Figure 6:
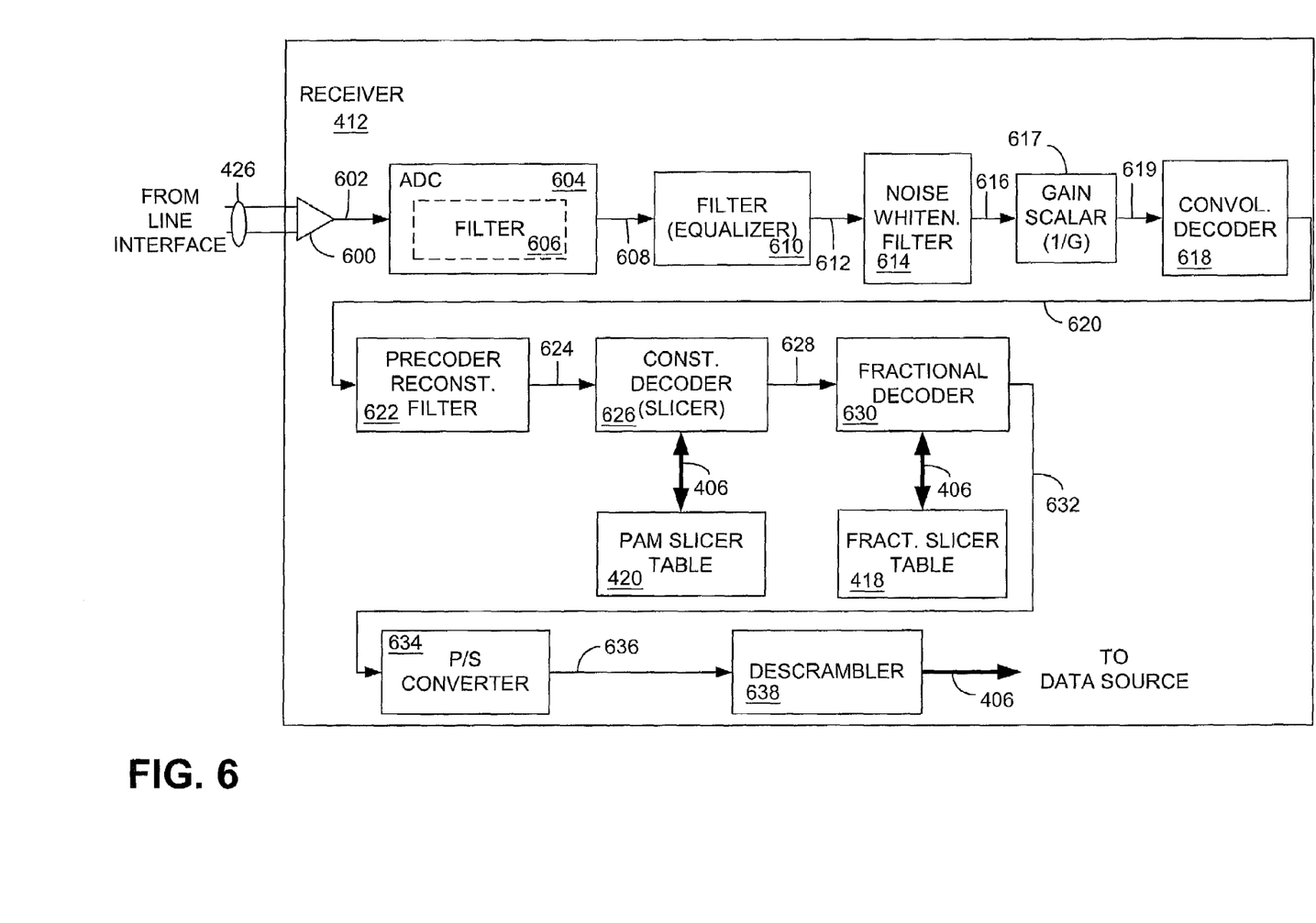
FIG. 6 is a block diagram illustrating one of a number of potential embodiments of the receiver of FIG. 4.

FIG. 6 is a block diagram illustrating an implementation of receiver 412 of FIG. 4. Although shown above in FIG. 4 as co-located, the following discussion will assume that receiver 412 is remotely located with respect to transmitter 410. A signal received on communication channel 206 is supplied via line interface 424 (FIG. 4) and via connection 426 to differential amplifier 600. The receive signal is then supplied via connection 602 to an analog-to-digital converter (ADC) 604. ADC 604 may include a filter 606 and/or an equalizer (not shown) to help control undesirable signals and intersymbol interference. ADC 604 converts the analog signal received on connection 602 into a serial bit stream of time domain samples that represent, on connection 608, the signal space constellation encoded in transmitter 412.

The serial bit stream on connection 608 is supplied to a filter 610. Filter 610 performs the reverse operation of the filter 526 (FIG. 5) by demodulating the serial bit stream on connection 608. For example, in the case of PAM, filter 610 may not be required or may be a low pass filter that performs the opposite operation of filter 526 in FIG. 5. The output of filter 610 may be a demodulated signal representing the encoded constellation point and is supplied over a connection 612 to a noise whitening filter 614.

Noise whitening filter 614 may perform the inverse operation of precoder 522 (FIG. 5) in order to provide the correct channel response on connection 616 to a gain scalar 1/G 617 and then to a convolutional decoder 618 on connection 619. Convolutional decoder 618 decodes the convolutional bits that are included in the serial bit stream on connection 616. The output of convolutional decoder 618 is supplied on a connection 620 to a precoder reconstruction filter 622.

Precoder reconstruction filter 622 may remove the modulo operation applied by precoder 522 in transmitter 410 by using an FIR filter and modulo operation (not shown) similar to those discussed above. The output of precoder reconstruction filter 622 on connection 624 is supplied to a constellation decoder 626. Constellation decoder 626 operates in cooperation with PAM slicer table 420 (FIG. 4) (which can be derived from the PAM encoder table 416 shown in Table 2) to recover the original encoded signal point by supplying an index representing the constellation point received for each symbol.

The output of constellation decoder 626 on connection 628 may be supplied to fractional decoder 630. Fractional decoder 630 is preferably a modulus converter similar to that described above and converts the groups of indices, or words, into a new set of binary words, which are restored in their original order. Fractional decoder 630 performs the opposite operation of fractional encoder 508 (FIG. 5) by using fractional slicer table 418 (FIG. 4) (which can be derived from fractional encoder table 414 shown in Table 1) to recover the original fractionally encoded symbols by supplying an index representing the constellation point received for each fractionally encoded symbol.

The output of fractional decoder 630 may be supplied via connection 632 to a parallel-to-serial converter 634, which may be implemented as a shift register. The serial bit stream on a connection 636 may be supplied to descrambler 638. Descrambler 638 descrambles the signal to recover the original bit stream on connection 406, and supplies this stream through the input/output element 400 (FIG. 4) to data source 202.

In one implementation, the fractional rate encoding system described herein achieves a 2.5 dB step in performance for a ½ bit change in the bits transmitted per symbol, providing a 2.5 dB performance improvement.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The Invention claimed is:

1. A method for encoding fractional bit rates in a communication system, comprising:
   receiving information from a destination transceiver, the information comprising information for determining a desired fractional bit rate of the destination transceiver and further including logic for encoding an integer number of bits into a plurality of symbols at the desired fractional bit rate using a plurality of signal space constellation points supported by the destination transceiver;
   based on the information from the destination transceiver, encoding an integer number of bits into the plurality of symbols at the desired fractional bit rate using the logic for encoding the integer number of bits into the plurality of symbols received from the destination transceiver, the ratio of the integer number of bits and the plurality of symbols being a non-integer; and
   based on the information from the destination transceiver, encoding each of the plurality of symbols into one of a plurality of analog symbols corresponding to the signal space constellation points.

2. The method of claim 1, wherein the encoding an integer number of bits into a plurality of symbols involves modulus conversion.

3. The method of claim 1, wherein the encoding an integer number of bits into a plurality of symbols involves shell mapping.

4. The method of claim 1, wherein the encoding an integer number of bits into a plurality of symbols involves constellation switching.

5. The method of claim 1, wherein the information received from the destination transceiver further comprises logic for mapping each of the plurality of symbols into one of a plurality of analog symbols and the encoding of each of the plurality of symbols into one of a plurality of analog symbols uses the logic for mapping each of the plurality of symbols into one of a plurality of analog symbols.

6. The method of claim 5, wherein the logic for mapping each of the plurality of symbols into one of a plurality of analog symbols comprises a plurality of mapping values for arrangement in at least one look-up-table, and the encoding of each of the plurality of symbols into one of a plurality of analog symbols uses the plurality of mapping values received from the destination transceiver in the at least one look-up table.

7. The method of claim 1, wherein the information from the destination transceiver further comprises an encoding algorithm and the encoding an integer number of bits into a plurality of symbols is performed using the encoding algorithm.

8. The method of claim 1, wherein the encoding each of the plurality of symbols into one of a plurality of analog symbols corresponding to the signal space constellation points is further based on the output of a forward error correction code device.

9. The method of claim 1, further comprising applying each of the plurality of analog symbols to a gain scalar.

10. The method of claim 1, further comprising providing the plurality of analog symbols corresponding to the signal space constellation points to the destination transceiver.

11. The method of claim 10, wherein the providing the plurality of analog symbols corresponding to the signal space constellation points to the destination transceiver is via a digital subscriber line (DSL).

12. The method of claim 1, wherein the communication system is a pulse amplitude modulation (PAM) system, and the signal space constellation points correspond to PAM levels.

13. The method of claim 1, wherein the number of signal space constellation points is not equal to a power of 2.

14. The method of claim 1, wherein the logic for encoding an integer number of bits into a plurality of symbols comprises a plurality of encoding values for arrangement in at least one look-up-table, and the encoding of the integer number of bits into the plurality of symbols uses the plurality of encoding values received from the destination transceiver in the at least one look-up table.

15. A transceiver, comprising:
means for receiving information from a destination transceiver, the information comprising information for determining a desired fractional bit rate of the destination transceiver and further including logic for encoding an integer number of bits into a plurality of symbols at the desired fractional bit rate using a plurality of signal space constellation points supported by the destination transceiver;
means for encoding, based on the information from the destination transceiver, an integer number of bits into the plurality of symbols at the desired fractional bit rate using the logic for encoding the integer number of bits into the plurality of symbols received from the destination transceiver, the ratio of the integer number of bits and the plurality of symbols being a non-integer; and
means for encoding, based on the information from the destination transceiver, each of the plurality of symbols into one of a plurality of analog symbols corresponding to the signal space constellation points.

16. The transceiver of claim 15, wherein the means for encoding an integer number of bits into a plurality of symbols involves a modulus conversion means.

17. The transceiver of claim 15, wherein the means for encoding an integer number of bits into a plurality of symbols involves a shell mapping means.

18. The transceiver of claim 15, wherein the means for encoding an integer number of bits into a plurality of symbols involves a constellation switching means.

19. The transceiver of claim 15, wherein the information received from the destination transceiver further comprises logic for mapping each of the plurality of symbols into one of a plurality of analog symbols and the encoding of each of the plurality of symbols into one of a plurality of analog symbols uses the logic for mapping each of the plurality of symbols into one of a plurality of analog symbols.

20. The transceiver of claim 19, wherein the logic for mapping each of the plurality of symbols into one of a plurality of analog symbols comprises a plurality of mapping values for arrangement in at least one look-up-table, and the encoding of each of the plurality of symbols into one of a plurality of analog symbols uses the plurality of mapping values received from the destination transceiver in the at least one look-up table.

21. The transceiver of claim 15, wherein the information from the destination transceiver further comprises an encoding algorithm and the encoding an integer number of bits into a plurality of symbols is performed using the encoding algorithm.

22. The transceiver of claim 15, wherein the encoding each of the plurality of symbols into one of a plurality of analog symbols corresponding to the signal space constellation points is further based on the output of a forward error correction encoding means.

23. The transceiver of claim 15, further comprising means for gain scaling each of the plurality of analog symbols.

24. The transceiver of claim 15, further comprising means for providing the plurality of analog symbols to the destination transceiver.

25. The transceiver of claim 24, wherein the plurality of analog symbols are provided to the destination transceiver via a digital subscriber line (DSL).

26. The transceiver of claim 15, wherein the signal space constellation points correspond to pulse amplitude modulation (PAM) levels.

27. The transceiver of claim 15, wherein the number of signal space constellation points is not equal to a power of 2.

28. The transceiver of claim 15, wherein the logic for encoding an integer number of bits into a plurality of symbols comprises a plurality of encoding values for arrangement in at least one look-up-table, and the encoding of the integer number of bits into the plurality of symbols uses the plurality of encoding values received from the destination transceiver in the at least one look-up table.

29. A transceiver for use in a communication system, comprising:
a receiver adapted to receive information from a destination transceiver, the information comprising information for determining a desired fractional bit rate of the destination transceiver and further including logic for encoding an integer number of bits into a plurality of symbols at the desired fractional bit rate using a plurality of signal space constellation points supported by the destination receiver;
a fractional encoder associated with the receiver, the fractional encoder adapted to encode the integer number of bits into a plurality of symbols at the desired fractional bit rate based on the logic for encoding the integer number of bits into the plurality of symbols received from the destination transceiver, the ratio of the integer number of bits and the plurality of symbols being a non-integer;

a constellation encoder associated with the fractional encoder, the constellation encoder adapted to encode, based on the information from the destination transceiver, each of the plurality of symbols into one of a plurality of analog symbols corresponding to the signal space constellation points; and a transmitter associated with the constellation encoder, the transmitter adapted to provide the plurality of analog symbols to the destination transceiver.

30. The transceiver of claim 29, wherein the fractional encoder encodes the integer number of bits into the plurality of symbols via modulus conversion.

31. The transceiver of claim 29, wherein the fractional encoder encodes the integer number of bits into the plurality of symbols via shell mapping.

32. The transceiver of claim 29, wherein the fractional encoder encodes the integer number of bits into the plurality of symbols via constellation switching.

33. The transceiver of claim 29, wherein the information received from the destination transceiver further comprises logic for mapping each of the plurality of symbols into one of a plurality of analog symbols and the constellation encoder is adapted to encode each of the plurality of symbols into one of the plurality of analog symbols based on the logic for mapping each of the plurality of symbols into one of a plurality of analog symbols.

34. The transceiver of claim 33, wherein the logic for mapping each of the plurality of symbols into one of a plurality of analog symbols comprises a plurality of mapping values for arrangement in at least one look-up-table, and the encoding of each of the plurality of symbols into one of a plurality of analog symbols uses the plurality of mapping values received from the destination transceiver in the at least one look-up table.

35. The transceiver of claim 29, wherein the information from the destination transceiver comprises an encoding algorithm and the fractional encoder is further adapted to implement the encoding algorithm to encode the integer number of bits into the plurality of symbols.

36. The transceiver of claim 29, wherein the constellation encoder is further adapted to encode each of the plurality of symbols into one of the plurality of analog symbols corresponding to the signal space constellation points based on the output of a forward error correction code encoder.

37. The transceiver of claim 29, further comprising a gain scalar.

38. The transceiver of claim 29, wherein the plurality of analog symbols are provided to a digital subscriber line (DSL).

39. The transceiver of claim 29, wherein:
the transceiver is for use in a pulse amplitude mode (PAM) communication system;
the signal space constellation points correspond to PAM levels; and
the constellation encoder is a PAM mapper.

40. The transceiver of claim 29, wherein the number of signal space constellation points is not equal to a power of 2.

41. The transceiver of claim 29, wherein the logic for encoding an integer number of bits into a plurality of symbols comprises a plurality of encoding values for arrangement in at least one look-up-table, and the encoding of the integer number of bits into the plurality of symbols uses the plurality of encoding values received from the destination transceiver in the at least one look-up table.

42. A method for controlling the symbol transmission rate in a communication system, comprising:
providing information to a source transceiver, the information comprising information capable of being used to determine a fractional bit rate to use for transmitting data to a destination transceiver and further comprising logic adapted to enable the source transceiver to encode an integer number of bits into a plurality of symbols at the desired fractional bit rate using a plurality of signal space constellation points supported by the destination transceiver;

receiving a plurality of analog symbols from the source transceiver, each of the plurality of analog symbols corresponding to a signal space constellation point of the plurality of signal space constellation points supported by the destination transceiver; and decoding the plurality of analog symbols into an integer number of bits comprising a plurality of symbols, the ratio of the integer number of bits and the plurality of symbols being a non-integer corresponding to the fractional bit rate.

43. The method of claim 42, wherein the decoding the plurality of analog symbols involves modulus conversion.

44. The method of claim 42, wherein the decoding the plurality of analog symbols involves shell mapping.

45. The method of claim 42, wherein the decoding the plurality of analog symbols involves constellation switching.

46. The method of claim 42, wherein the information comprises a number of signal space constellation points.

47. The method of claim 42, wherein the information provided to the source transceiver further comprises mapping logic adapted to enable the source transceiver to encode each of the plurality of symbols into one of the plurality of analog symbols.

48. The method of claim 47, wherein the mapping logic adapted to enable the source transceiver to map each of the plurality of symbols into one of the plurality of analog symbols comprises a plurality of mapping values for arrangement in at least one look-up-table.

49. The method of claim 42, wherein the information further comprises an encoding algorithm adapted to enable the source transceiver to execute the encoding algorithm and encode at the fractional bit rate.

50. The method of claim 49, wherein the encoding algorithm involves modulus conversion.

51. The method of claim 49, wherein the encoding algorithm involves shell mapping.

52. The method of claim 49, wherein the encoding algorithm involves constellation switching.

53. The method of claim 42, wherein, the communication system is a pulse amplified modulation (PAM) system, and the signal space constellation is a PAM signal space constellation.

54. The method of claim 42, wherein the logic adapted to enable the source transceiver to encode an integer number of bits into a plurality of symbols comprises a plurality of encoding values for arrangement in at least one look-up-table.

55. A transceiver for use in a communication system, comprising:
means for providing information to a source transceiver, the information comprising information capable of being used to determine a fractional bit rate to use for transmitting data to a destination transceiver and further comprising logic adapted to enable the source transceiver to encode an integer number of bits into a plurality of symbols at the desired fractional bit rate using a plurality of signal space constellation points supported by the destination transceiver;

means for receiving a plurality of analog symbols from the source transceiver, each of the plurality of analog symbols corresponding to a signal space constellation point of the plurality of signal space constellation points supported by the destination transceiver; and means for decoding the plurality of analog symbols into an integer number of bits comprising a plurality of symbols, the ratio of the integer number of bits and the plurality of symbols being a non-integer corresponding to the fractional bit rate.

56. The transceiver of claim 55, wherein the means for decoding the plurality of analog symbols involves a modulus conversion means.

57. The transceiver of claim 55, wherein the means for decoding the plurality of analog symbols involves a shell mapping means.

58. The transceiver of claim 55, wherein the means for decoding the plurality of analog symbols involves a constellation switching means.

59. The transceiver of claim 55, wherein the information comprises a number of signal space constellation points.

60. The transceiver of claim 55, wherein the information provided to the source transceiver further comprises mapping logic adapted to enable the source transceiver to encode each of the plurality of symbols into one of the plurality of analog symbols.

61. The transceiver of claim 60, wherein the mapping logic adapted to enable the source transceiver to map each of the plurality of symbols into one of the plurality of analog symbols comprises a plurality of mapping values for arrangement in at least one look-up-table.

62. The transceiver of claim 55, wherein the information further comprises an encoding algorithm adapted to enable the source transceiver to execute the encoding algorithm and encode at the fractional bit rate.

63. The transceiver of claim 62, wherein the encoding algorithm involves modulus conversion.

64. The transceiver of claim 62, wherein the encoding algorithm involves shell mapping.

65. The transceiver of claim 62, wherein the encoding algorithm involves constellation switching.

66. The transceiver of claim 55, wherein the logic adapted to enable the source transceiver to encode an integer number of bits into a plurality of symbols comprises a plurality of encoding values for arrangement in at least one look-up-table.

67. A transceiver for use in a communication system, comprising:

a transmitter adapted to provide information to a source transceiver, the information comprising information capable of being used to determine a fractional bit rate to use for transmitting data to a destination transceiver and further comprising logic adapted to enable the source transceiver to encode an integer number of bits into a plurality of symbols at the desired fractional bit rate using a plurality of signal space constellation points supported by the destination transceiver;

a receiver adapted to receive a plurality of analog symbols from the source transceiver, each of the plurality of analog symbols corresponding to a signal space constellation point of the plurality of signal space constellation points supported by the destination transceiver; and a fractional decoder adapted to decode the plurality of analog symbols into an integer number of bits comprising a plurality of symbols, the ratio of the integer number of bits and the plurality of symbols being a non-integer corresponding to the fractional bit rate.

68. The transceiver of claim 67, wherein the fractional decoder is a modulus converter.

69. The transceiver of claim 67, wherein the fractional decoder is a shell mapper.

70. The transceiver of claim 67, wherein the fractional decoder employs constellation switching.

71. The transceiver of claim 67, wherein the information comprises a number of signal space constellation points.

72. The transceiver of claim 67, wherein the information provided to the source transceiver further comprises mapping logic adapted to enable the source transceiver to encode each of the plurality of symbols into one of the plurality of analog symbols using the plurality of mapping values.

73. The transceiver of claim 72, wherein the mapping logic adapted to enable the source transceiver to map each of the plurality of symbols into one of the plurality of analog symbols comprises a plurality of mapping values for arrangement in at least one look-up-table.

74. The transceiver of claim 67, wherein the information further comprises an encoding algorithm adapted to enable the source transceiver to execute the encoding algorithm and encode at the fractional bit rate.

75. The transceiver of claim 74, wherein the encoding algorithm involves modulus conversion.

76. The transceiver of claim 74, wherein the encoding algorithm involves shell mapping.

77. The transceiver of claim 74, wherein the encoding algorithm involves constellation switching.

78. The transceiver of claim 67, wherein the communication system is a pulse amplitude modulation (PAM) communication system and the signal space constellation is a PAM signal space constellation.

79. The transceiver of claim 67, wherein the logic adapted to enable the source transceiver to encode an integer number of bits into a plurality of symbols comprises a plurality of encoding values for arrangement in at least one look-up-table.

80. A method comprising:

receiving information from a destination transceiver, the information comprising an indicator of a desired fractional bit rate and further comprising logic for encoding an integer number of bits into a plurality of symbols at the desired fractional bit rate using a plurality of signal space constellation points supported by the destination transceiver; and encoding the integer number of bits into the plurality of symbols using the logic received from the destination transceiver at the desired fractional bit rate, the ratio of the integer number of bits and the plurality of symbols being a non-integer.

81. The method of claim 80, further comprising:

receiving mapping logic from the destination transceiver, the mapping logic for encoding a plurality of symbols into one of a plurality of analog symbols that correspond to signal space constellation points supported by the destination transceiver; and encoding the plurality of symbols into one of the plurality of analog symbols using the mapping logic received from the destination transceiver.

82. The method of claim 80, wherein the encoding an integer number of bits into a plurality of symbols involves modulus conversion.

83. The method of claim 80, wherein the encoding an integer number of bits into a plurality of symbols involves shell mapping.

84. The method of claim 80, wherein the encoding an integer number of bits into a plurality of symbols involves constellation switching.

85. The method of claim 80, wherein the information received from the destination transceiver further comprises logic for mapping each of the plurality of symbols into one of a plurality of analog symbols and the encoding of each of the plurality of symbols into one of a plurality of analog symbols uses the logic for mapping each of the plurality of symbols into one of a plurality of analog symbols.

86. The method of claim 85, wherein the encoding each of the plurality of symbols into one of a plurality of analog symbols corresponding to the signal space constellation points is further based on the output of a forward error correction code device.

87. The method of claim 85, further comprising applying each of the plurality of analog symbols to a gain scalar.

88. The method of claim 85, further comprising providing the plurality of analog symbols corresponding to the signal space constellation points to the destination transceiver.

89. The method of claim 85, wherein the providing the plurality of analog symbols corresponding to the signal space constellation points to the destination transceiver is via a digital subscriber line (DSL).

90. The method of claim 80, wherein the communication system is a pulse amplitude modulation (PAM) system, and the signal space constellation points correspond to PAM levels.

91. The method of claim 80, wherein the number of signal space constellation points is not equal to a power of 2.

92. The method of claim 80, wherein the information from the destination transceiver further comprises an encoding algorithm and the encoding the integer number of bits into the plurality of symbols is performed using the encoding algorithm.

* * * * *